May 6, 1958  K. C. BROWN  2,833,564
BALL HITCH CONNECTOR
Filed Nov. 6, 1956

Kale C. Brown
INVENTOR.

2,833,564
Patented May 6, 1958

2,833,564
BALL HITCH CONNECTOR

Kale C. Brown, Brainerd, Minn.

Application November 6, 1956, Serial No. 620,679

2 Claims. (Cl. 280—512)

The present invention relates to a vehicle coupling of the type which is commonly referred to in the trade and the art as a tractor and trailer hitch, more specifically, one which is characterized by a relatively stationary or fixed ball joint member and a connector which is connectible with said member to provide a desired coupling action.

As is evident from the preceding general statement of the nature of the subject matter of the invention the construction broadly set forth is old and well-known. Also, during the course of development of hitches, those engaged in the art have suggested the adoption and use of a connector characterized by a rigid plate or an equivalent structure having a socket member for retentive reception of the aforementioned connecting ball wherein said member is composed of companion stationary and movable parts with the movable part swingable to an open position to assist one in attaching and detaching the connector member. The present invention pertains to this phase of the prior art. That is to say, the matter at hand has to do with an improved sectional socket member and also to a staple and hasp arrangement making the use of a safe-guarding padlock possible.

Other objects, features and advantages will become more readily apparent from the following description and the accompanying sheet of illustrative drawings.

In the drawings, wherein like numerals are employed to designate like parts throughout the views.

Figure 2:
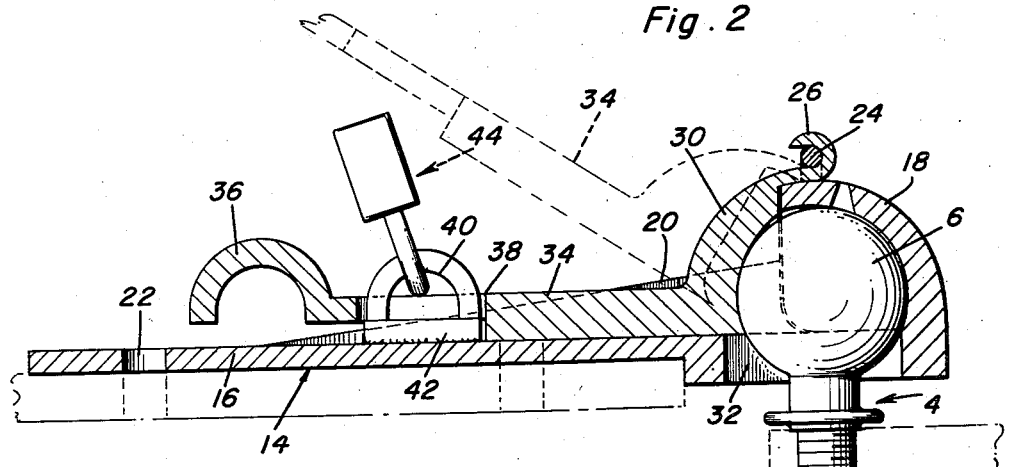
Figure 2 is a view in section and elevation detailing the components more completely.
Figure 3:
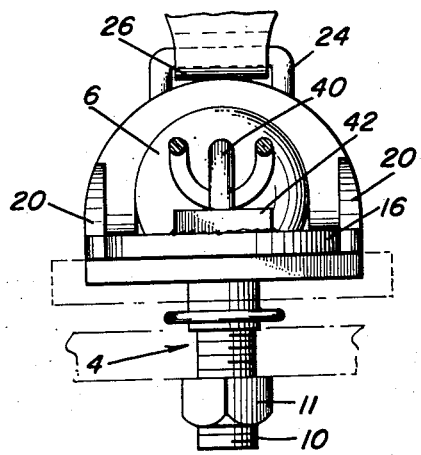
Figure 3 is an end view observing the structure of Figure 2 in a direction from left to right.

Referring now to the drawings the ball joint member or means is denoted generally by the numeral 4 in Figures 2 and 3 and has the usual ball-shaped head 6 and threaded shank 10 held in place by an assembling and clamping nut 11. The invention, of course, resides in the specific construction of the connector unit or member. This member is essentially a two-part construction. The lower part or section is denoted generally by the numeral 12 and the upper part or section by the numeral 14. The part 12 comprises an elongate tongue-like plate 16 having one end formed into a part-spherical component or section 18 of the openable and closeable socket member. The numerals 20 designate the lengthwise webs which extend from the basal portion along the marginal edges of the plate and which serve to reinforce the part 12. The plate is provided at appropriate points with bolt holes 22 to accommodate suitable fasteners (not shown). The crown portion of the socket section 18 is provided with an upstanding integral U-shaped hinging member 24 which serves to accommodate the hinging hook portion 26 on the shank 28 carried by the cooperating crown portion of the socket section 30. This section is also part-spherical in form and the two sections 18 and 30 provide a substantially hemispherical or what is sometimes referred to as a dome-like socket member. In any event, the two sections 18 and 30 of the socket member can be opened and closed to facilitate making the connection with the ball head 6. It will be noticed in Figure 2 that the portion of the plate directly beneath the socket member has a suitably sized opening 32 therein to permit the ball to be inserted and removed or vice versa. The socket section 14 has an outstanding extension or arm 34 which parallels and overlies the plate 16 and which may be provided at its free end with a suitable finger-hook or grip 36. Intermediate its ends it is provided with a slot 38 to accommodate a staple 40 carried by and rising from a block-like boss or member 42 which is welded or otherwise integrated with the central portion of the plate 16. The arm 34 is notched as at 43 to provide a firm joint between the member 42 and said arm. Because the arm 34 is constructed as shown and described it forms what may be here satisfactorily called a hasp. The staple and hasp cooperate in the manner shown to accommodate the shackle of a padlock 44, thus rendering the device safe and also theft-proof.

It will be obvious that the aforementioned arm 34 serves not only as a hasp and part of the padlock accommodation means but also as a handle or lever for opening and closing the jaw-like section 30 of the socket member.

Figure 1:
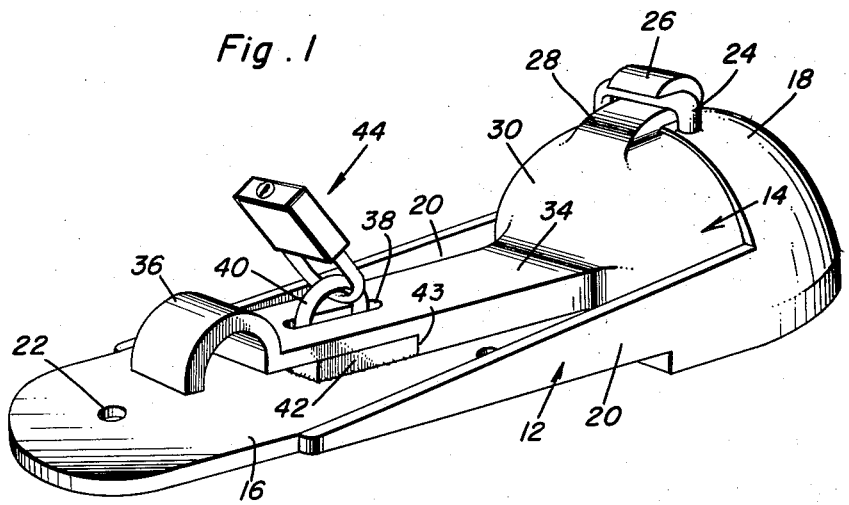
Figure 1 is a perspective view of a vehicle or an equivalent hitch constructed in accordance with the invention and showing the parts of the same closed and in readiness for use.

The detailed construction appears to be clearly apparent from the illustration thereof in Figure 1 and the manner in which these parts cooperate with each other. Also the ball jointing means or member appears to be evident from Figures 2 and 3 considered singly and collectively.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in conjunction with a ball joint member such as is used, for example, as a component part of a ball-type vehicle hitch, a connector member comprising an elongated rigid plate provided at one end with an upstanding part-spherical socket section and also provided beneath said socket section with a circular opening, at least one-half portion of which is in alignment beneath the socket section and the other half portion projects beyond the open side of said socket section, said opening being of a diameter to permit passage of the ball of the joint member therethrough for cooperation with said socket section, the crown portion of said socket section being provided with an upstanding U-shaped clevis, a second part-spherical socket section cooperable with said first socket section and provided on its crown portion with a hook constituting a hinging member and which is releasably and hingedly connected with said clevis, said second socket section being disposed in the plane above the plate and having an arm attached to and extending therefrom and normally adapted to rest atop said plate, said arm being provided with a free end equipped with a finger grip and constituting a hasp and having a slot therein, and a staple fixedly mounted on and rising from said plate and adapted to extend through the slot in the hasp to, in this manner, accommodate the shackle of a padlock.

2. The structure defined in claim 1 and wherein said staple is carried by a block-like boss which is mounted on the plate and provides, in addition, a stop shoulder, a portion of said hasp-forming arm being notched to clear but rest upon said boss and to also provide a shoulder having end thrust abutting relation with said boss.

References Cited in the file of this patent

UNITED STATES PATENTS

| | | |
|---|---|---|
| 466,845 | De Vault | Jan. 12, 1892 |
| 2,130,705 | Radeleff | Sept. 20, 1938 |
| 2,580,770 | Harris | Jan. 1, 1952 |